United States Patent
Gross

(10) Patent No.: US 12,479,563 B2
(45) Date of Patent: Nov. 25, 2025

(54) METHOD FOR PRODUCING A FUSELAGE STRUCTURAL COMPONENT FOR A TRIANGLE REGION, AND INTEGRAL FUSELAGE STRUCTURAL COMPONENT

(71) Applicant: Airbus Operations GmbH, Hamburg (DE)

(72) Inventor: Claus-Peter Gross, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/438,900

(22) Filed: Feb. 12, 2024

(65) Prior Publication Data
US 2024/0286760 A1    Aug. 29, 2024

(30) Foreign Application Priority Data
Feb. 27, 2023 (EP) .................................... 23158695

(51) Int. Cl.
*B64C 1/06* (2006.01)

(52) U.S. Cl.
CPC .................................... *B64C 1/064* (2013.01)

(58) Field of Classification Search
CPC .. B23P 2700/01; B23P 2700/13; B64C 1/064; B64C 1/06; B64C 1/068; B64C 1/10; B64C 1/18; B64F 5/10
See application file for complete search history.

(56) References Cited

U.S. PATENT DOCUMENTS

| | | | |
|---|---|---|---|
| 1,766,961 A | 6/1930 | Steuart | |
| 2009/0321569 A1* | 12/2009 | Schroeer | B64C 1/061 244/119 |
| 2012/0153082 A1* | 6/2012 | Rosman | B64C 1/12 403/179 |
| 2013/0009008 A1* | 1/2013 | Westphal | B64C 1/18 244/119 |
| 2013/0306795 A1 | 11/2013 | Delahaye et al. | |
| 2014/0042271 A1 | 2/2014 | Paci et al. | |
| 2015/0083861 A1* | 3/2015 | Alby | B64C 1/18 244/119 |
| 2015/0343702 A1* | 12/2015 | García Martín | B64C 3/24 156/349 |

FOREIGN PATENT DOCUMENTS

| | | |
|---|---|---|
| DE | 102007030026 A1 | 1/2009 |
| DE | 102017131044 A1 | 6/2019 |
| EP | 2695726 A2 | 2/2014 |
| GB | 159351 A | 3/1921 |

OTHER PUBLICATIONS

European Search Report for corresponding European Patent Application No. 23158695.9 dated Aug. 3, 2023.

* cited by examiner

*Primary Examiner* — Christopher J. Besler
(74) *Attorney, Agent, or Firm* — Greer, Burns & Crain, Ltd.

(57) ABSTRACT

A method for producing a fuselage structural component for a triangle region of an aircraft by: providing an integral board of a former material, wherein the board has an opening; and deforming at least one internal edge of the board that forms the opening to an internal flange; and deforming at least one external edge of the board to an external flange. Adjacent to the opening, the integral and deformed board forms in each case a former portion, a floor beam and a vertical support. Also a fuselage structural component and an aircraft with the fuselage structural component.

13 Claims, 9 Drawing Sheets

FIG 4
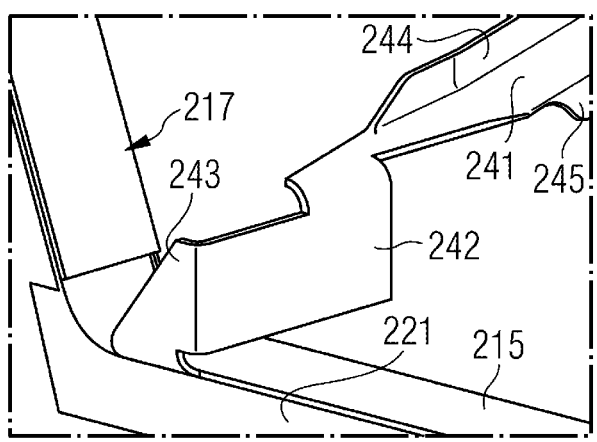
View A
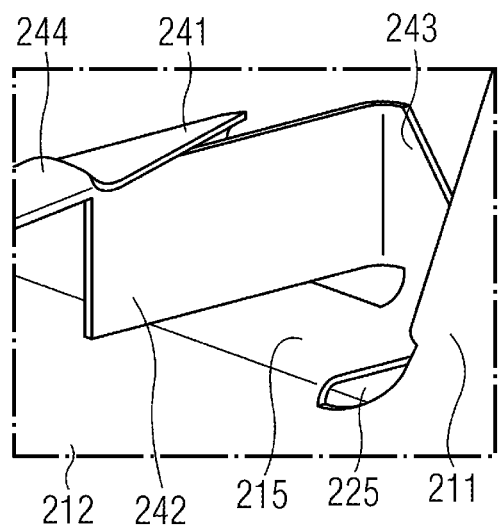
View B
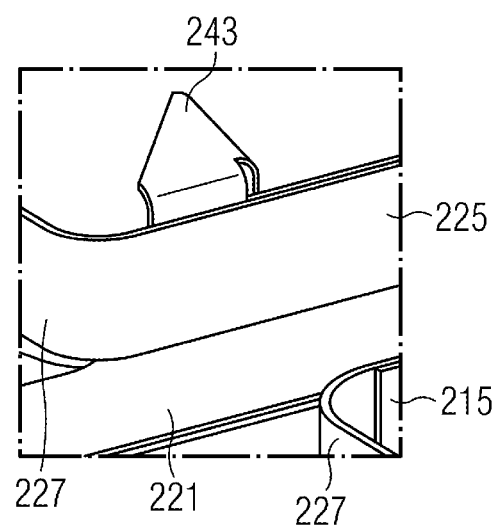

METHOD FOR PRODUCING A FUSELAGE STRUCTURAL COMPONENT FOR A TRIANGLE REGION, AND INTEGRAL FUSELAGE STRUCTURAL COMPONENT

CROSS-REFERENCES TO RELATED APPLICATIONS

This application claims the benefit of European Patent Application Number 23 158 695.9 filed on Feb. 27, 2023, the entire disclosure of which is incorporated herein by way of reference.

FIELD OF THE INVENTION

The invention relates to a method for producing a fuselage structural component for a triangle region of an aircraft, and to an integral fuselage structural component, and to an aircraft having a corresponding fuselage structural component. The invention relates in particular to a method for producing an integral fuselage structural component with integrally molded flanges, and to a corresponding fuselage structural component and to an aircraft.

BACKGROUND OF THE INVENTION

Two so-called triangle regions are usually located in the lower deck of an aircraft, thus in a region of the aircraft fuselage below an intermediate floor, such as in a cargo deck, for example. In a cross-sectional view of the aircraft, these triangle regions are in each case defined by the external structure of the aircraft fuselage (for example the formers), the transverse spars of the intermediate floor (for example the beams of the intermediate floor) and so-called Z-struts which each support a beam of the intermediate floor on a former and usually run vertically. The Z-struts also serve to stiffen the aircraft structure below the intermediate floor.

Each of the Z-struts below the intermediate floor (usually two) lies in the outer region of the cargo deck and is therefore difficult to access by the personnel during the installation of the Z-struts. For example, the working height is already restricted due to the intermediate floor, while the round aircraft fuselage cause a floor which becomes increasingly oblique. This leads to ergonomically unfavorable conditions for the personnel.

SUMMARY OF THE INVENTION

The invention is therefore directed to an object of providing a production method, a fuselage structural component, and an aircraft which enable simplified assembling of the triangle region.

This object may be achieved by a method having the features of one or more embodiments described herein, and by a fuselage structural component having the features of one or more embodiments described herein, and by an aircraft having the features of one or more embodiments described herein.

According to a first aspect for improved understanding of the present disclosure, a method for producing a fuselage structural component for a triangle region of an aircraft comprises providing an integral board of a former material, wherein the board has an opening. The integral board is on the one hand made from a continuous material and thus does not have to be assembled (from a multiplicity of components). Board herein means a substantially flat component of which the width and length are much greater than the thickness thereof.

The opening in the board is disposed in an arbitrary region of the board. The opening corresponds to a clearance of the board where no former material is provided. Accordingly, the opening comprises an internal edge of the board. Since this is a fuselage structural component which forms a portion of a fuselage structure of an aircraft, the board has a further internal edge which in the installed state of the fuselage structural component points into the interior of the aircraft. Accordingly, the board has at least one external edge which in the installed state of the fuselage structural component points away from a center of the aircraft.

Furthermore, the method comprises deforming at least one internal edge of the board that forms the opening to an internal flange, and deforming at least one external edge of the board to an external flange. A flange is thus to be understood to be a deformation of the board on the internal edge, which projects from the plane of the board. The internal flange and the external flange can point in the same direction or in different directions.

Adjacent to the opening, the integral and deformed board forms in each case a former portion, a floor beam and a vertical support. In other words, the deformed board forms a triangle region which comprises the triangular opening and about the latter a portion of a former of the aircraft, a portion of a horizontal floor beam and a vertical beam. In terms of its function, the vertical beam corresponds to a Z-strut or else a vertical support.

Since these components that form the triangle region are formed from the integral board, the entire assembly process of a usual triangle region is dispensed with. In said process, transverse spars for the floor, or entire floor elements, are fastened to the former. The Z-strut is subsequently installed below the floor and mechanically fastened to the transverse spar and the former so as to form the triangle region. The ergonomically unfavorable work required for this purpose is completely dispensed with. There is likewise a significant reduction in the number of components. Moreover, deforming the board can take place outside the aircraft fuselage, so that the fuselage structural component can be produced in a temporally and also spatially independent manner.

Since the board is integral, the fuselage structural component produced in this way is also lighter in comparison to hitherto conventional constructions. On the one hand, all of the fasteners (bolts, nuts, etc.) are dispensed with. On the other hand, there is also no requirement for overlapping regions such as, for example, a respective U-shaped or L-shaped end at the top and the bottom of the Z-strut, which encloses and overlaps the transverse spar, or the former, respectively.

The internal flange and the external flange form a reinforcement of the corresponding portion of the board, because the flange extends in a different direction (or plane) than the board, both before and after deformation. As a result, only the deformation steps are required in order to produce the entire triangle region including structures required for statics.

The fuselage structural component produced in this way can be connected to further former portions. Usual connecting methods can be used herein, such as welding, adhesive bonding, screw connections or rivets, for example. A complete former is usually produced from a plurality of former portions, so that the fuselage structural component with triangle region produced herein can be easily integrated into the production process of the complete former.

In one implementation variant, providing the board can comprise removing the former material from the board in the region of the opening.

According to one exemplary implementation, the board can thus be made of a metal or an alloy. This board can be produced by rolling so that the board corresponds to a panel. Only by way of example, removing can comprise milling or punching, whereby the opening is milled or punched into the metal or the alloy. This production method is easy to carry out and therefore involves low costs and requires little working time.

In another exemplary implementation, the board can be composed of a composite material. For example, the board can be composed of a woven fabric (glass fiber, carbon fiber, or the like) with a curable matrix (epoxy resin, thermoplastic synthetic material, or the like). In this case, the opening can indeed also be milled or punched. However, the composite material can be produced so as to already include an opening.

In one implementation variant, deforming (of the internal flange as well as of the external flange) can be performed by pressing. In the case of a metal or a thermoplastic synthetic material, the internal edge and/or the external edge can be easily produced by plastic deformation, i.e., by compressing the board between a die and a negative mold. Depending on the material, the board may also be at least partially heated in the process.

When pressing, the negative mold can be of an arbitrary material, for example wood, metal or plastics material. The die can also be made of any arbitrary material, for example wood, metal, plastics material or rubber, or a combination thereof.

The fuselage structural component can be produced in a simple manner and particularly quickly by pressing, because the structures required for statics, such as the internal flange and the external flange, for example, can be produced in a single operative step.

Alternatively or additionally, the internal flange and/or the external flange can be produced by folding or clinching. A more precise kink in the flange can potentially be formed as a result. The flange can also be cut during folding or clinching, as a result of which any arbitrary length of the flange can be precisely produced. However, folding or clinching is more time-consuming in comparison to pressing.

In a further implementation variant, the method can further comprise incorporating a reinforcement element. The reinforcement element herein preferably bears on a planar portion of the board and on the internal flange.

For example, the reinforcement element can form a plating in a specific portion of the fuselage structural component. The reinforcement element herein can have a cross section which corresponds to that of the corresponding portion of the fuselage structural component, so that the reinforcement element, when viewed in cross section, at least largely follows the portion of the fuselage structural component and bears in a planar manner on the latter.

Likewise by way of example, the reinforcement element can be a plating on a flange. The flange is statically reinforced as a result. One or a plurality of reinforcement elements can in particular be attached to one or a plurality of flanges of the floor beam and/or the vertical support.

The reinforcement element can also be provided on a floor element or intermediate floor to be attached. The reinforcement of the flange (for example by corresponding plating) in this instance is achieved only when the floor element, or the intermediate floor, and the fuselage structural component are assembled.

The reinforcement element can be fastened to the fuselage structural component by welding, adhesive bonding, screwing or riveting.

In yet another implementation variant, the reinforcement element can have at least one appendage which extends from one end of the internal flange and has an arc. A portion of the reinforcement element herein that bears on the internal flange can in particular extend beyond the end of the internal flange. This enhances the stability of the entire fuselage structural component.

For example, the arc of the reinforcement element can run along a corner of the opening in the board. This makes it possible to configure the at least one internal flange along rectilinear internal edges of the opening, and not in the region of the corner of the opening, the latter being more difficult to produce by deformation. In this instance, the arc of the reinforcement element assumes the task of reinforcing the corner.

Furthermore, the arc of the reinforcement element can overlap a further internal flange and/or be fastened to the latter. As a result, two neighboring internal flanges can be mechanically connected to one another by way of the arc, and the corner can be structurally enhanced and reinforced.

The thickness of the material of the reinforcement element can be selected so as to correspond to the component to be reinforced. It goes without saying that a plurality of reinforcement elements can also be attached to the fuselage structural component in order to structurally enhance corresponding regions of the fuselage structural component. The board (and thus the remaining part of the fuselage structural component) can be provided with a uniform thickness by incorporating one or a plurality of reinforcement elements. This simplifies the production process of the board. Deforming the edges to a respective flange also requires the same deformation energy. For example, all internal flanges can be integrally formed simultaneously in one procedure (for example a pressing procedure), this being facilitated by a uniform thickness of the board.

In another implementation variant, providing the integral board can comprise providing a board with regions of different thicknesses. For example, the board (before the steps of deforming) can be produced and provided as a panel or flat component with regions of different thicknesses (regions of different strength). In this way, the board can already be provided with an integrated reinforcement element, or with reinforced regions, respectively.

These regions of different thicknesses can be achieved for example by rolling or pressing, using corresponding templates/molds/dies. Alternatively or additionally, portions of the board can also be sanded or milled in order to obtain a thinner layer thickness. Likewise alternatively or additionally, a different thickness of the board can be achieved by means of corresponding three-dimensional molds during production of the board, in particular in the case of a plastics material.

The board produced in this way can dispense with additional reinforcement elements. However, the complexity in terms of production of the board is higher so that the type of reinforcement needs to be assessed.

Only by way of example, the board can be of a thicker configuration in particular in a region in which the former portion intersects the floor beam and/or the former portion intersects the vertical support. It is likewise possible to configure the board to be thicker in the region in which the floor beam intersects the vertical support. In these regions, forces are introduced into the respective other portion, and in particular into the former portion. Therefore, a thicker board in this region corresponds to a reinforcement that prevents deformation such as, for example, bulging and/or kinking.

As a further example, regions which during deforming are formed to a flange can be provided with a greater board thickness. As a result, it is possible to provide already reinforced flanges on the fuselage structural component.

In another implementation variant, deforming an internal edge to the internal flange can comprise deforming a plurality of internal edges to a respective internal flange. In this way, a flange is configured on each deformed internal edge. The internal flange herein is interrupted in a corner between two internal edges. This simplifies the deformation and enables a sharp kink between the board and the internal flange. It is likewise possible to also achieve a deformation of the board beyond 90°, which may be required for further components to be attached, for example.

Alternatively, deforming an internal edge to the internal flange can comprise deforming a plurality of internal edges to a single internal flange which is formed to be continuous between two internal edges in at least one corner. In other words, the internal edge is still continuous, despite forming an internal flange which is continuous on two internal edges disposed obliquely to one another after deformation (when the board is viewed from above). The continuously formed internal flange herein can be configured to be round at the corner. This enhances the stiffening of the fuselage structural component in the region at the corner of the opening. A separate reinforcement element can be dispensed with in this way.

In yet another implementation variant, the continuously formed internal flange can have different heights. The height of the internal flange here is understood to be a spacing of the internal edge (now of the flange) from the plane of the (remaining part of the) board, or alternatively the length of the flange from the flat board to the deformed internal edge. A greater height of a flange means a greater reinforcement in this region of the board by the "L-beam" formed in this way. The height of the flange may be smaller in regions in which a great reinforcement is not a structural requirement. Only by way of example, the internal edge along the former portion can be formed to an internal flange of lesser height, while an internal flange of greater height is formed in the regions of the corners of the opening and along the floor beam and the vertical support.

Alternatively, the internal flange can have a lesser height in the regions of the corners of the opening than in the (elongate) regions of the floor beam, of the vertical support and/or of the former portion. This simplifies the deformation of the external edge of the board in the region of the corners.

An exemplary height of the internal flange is between 5 mm and 30 mm, preferably between 5 mm and 15 mm, and particularly preferably 10 mm or 10.4 mm. This applies in particular to regions with the greater height of the internal flange. The regions with a lesser height can depend thereon and be chosen in an arbitrary manner in order to adhere to the structural requirements and/or deformation possibilities.

In a further implementation variant, the continuously formed internal flange in a corner between two internal edges can have an angle of 110° to 140°, preferably of 120° to 130°, in relation to the board. In other words, the internal edge in the corner of the opening is bent by 70° to 40°, preferably by 60° to 50°, in order to form the internal flange. Deforming the internal edge to an internal flange is more difficult in particular in the region of the corner of the opening, because a flange with a round profile has to be formed. An excessively small angle between the board and the flange (thus a large deformation) can lead to cracks forming in the former material. An excessively large angle between the board and the flange (thus a small deformation) can lead to an excessively small flange which does not have the desired reinforcing effect. Only by way of example, the internal flange can also be further deformed in the region of the floor beam, of the vertical support and/or of the former portion. The internal flange in this region can thus have an angle of up to 90° in relation to the board.

In yet another implementation variant, the method can comprise deforming a portion of the board to a diagonal strut or brace which is formed to be integral to the board. A customary diagonal strut is usually disposed between two formers and fastened to the latter, wherein the diagonal strut is disposed obliquely in relation to each of the formers. As a result, forces in the longitudinal direction of the aircraft (X-axis) can be transmitted between the formers. Moreover, torsional forces in the aircraft fuselage and vertical forces (Z-axis) can also be transmitted. Since the diagonal strut extends away from one of the formers, the material provided, which forms the board, can already comprise the diagonal strut. This corresponding portion of the board can now be deformed, in particular be bent out of the plane of the board and into the later direction of extent.

In one implementation variant, the steps of deforming can be carried out simultaneously. In this way, all internal flanges and all external flanges can be formed simultaneously in a single method step, which has the effect of saving a lot of time and thus lowering costs. Likewise, the step of deforming a portion of the board to a diagonal strut can also be carried out simultaneously with deforming all internal flanges and/or all external flanges.

According to a second aspect for improved understanding of the present disclosure, a fuselage structural component for a triangle region of an aircraft comprises an integral board of a former material, wherein the board has an opening. It is a predominantly flat board of the material from which the former is formed.

The fuselage structural component furthermore comprises at least one internal flange which is formed on an internal edge of the board that forms the opening; and at least one external flange which is formed on an external edge of the board. An internal flange is located closer to a center of a cross section of the aircraft fuselage than an external flange. For example, the at least one external flange can be formed exclusively on an external edge of the board that faces an external skin of the aircraft attached at a later stage. One or a plurality of internal flanges can be integrally formed on an internal edge of the board that faces the center of the aircraft fuselage, and/or be integrally formed on an internal edge of the opening of the board.

The integral board forms a former portion, a floor beam and a vertical support, all of which being adjacent to the opening. In this way, the former portion, the floor beam and the vertical support are provided by a continuous material, without the assembling of different components and connecting/fastening the latter to one another being required for this purpose.

The fuselage structural component can be produced by the method according to the first aspect, or by one or a plurality of implementation variants of said method.

According to a third aspect for improved understanding of the present disclosure, an aircraft comprises a fuselage structural component for a triangle region according to the second aspect.

The aircraft can comprise a multiplicity of such fuselage structural components, as a result of which the overall build time of the aircraft can be significantly reduced. This saves costs and simplifies the work for the respective personnel, specifically in the triangle region.

In one implementation variant, an intermediate floor can be attached and fastened to the floor beam. The intermediate floor can be a customary cabin floor of an aircraft, which separates a passenger area/cabin area of the aircraft from a cargo area lying there below. As a result, the triangle region in the aircraft is produced before the associated work area is covered and restricted by the intermediate floor.

In a further implementation variant, a stringer having an external skin of the aircraft can be fastened to the at least one external flange. The external skin of the aircraft can be attached to a multiplicity of stringers. Such a stringer can be fastened to the at least one external flange by welding, adhesive bonding, screwing or riveting. A customary work procedure can be used herein, because customary formers have so-called clips which are first attached to the former, and the stringers in turn are attached to the clips. As a result of the external flanges according to the present disclosure, which are integrated in the former, the build time of the aircraft is likewise significantly shortened, because, in the case of a customary mode of constructing an aircraft, a multiplicity of clips have to be attached to a multiplicity of formers.

It goes without saying that the aspects, embodiments, variants and examples described above can be combined without this being explicitly described. Each of the variants described, and each example, are therefore to be seen as optional with respect to each of the aspects, embodiments, variants and examples, or indeed combinations thereof. The present disclosure is thus not limited to the individual embodiments and implementation variants in the sequence described, or any specific combination of the aspects and implementation variants.

BRIEF DESCRIPTION OF THE DRAWINGS

Preferred exemplary embodiments of the invention will now be explained in more detail by means of the appended schematic drawings, in which:

FIG. 4 schematically shows a detailed view of a reinforcement element and of the diagonal strut from FIG. 3;

DETAILED DESCRIPTION OF THE PREFERRED EMBODIMENTS

Figure 1:
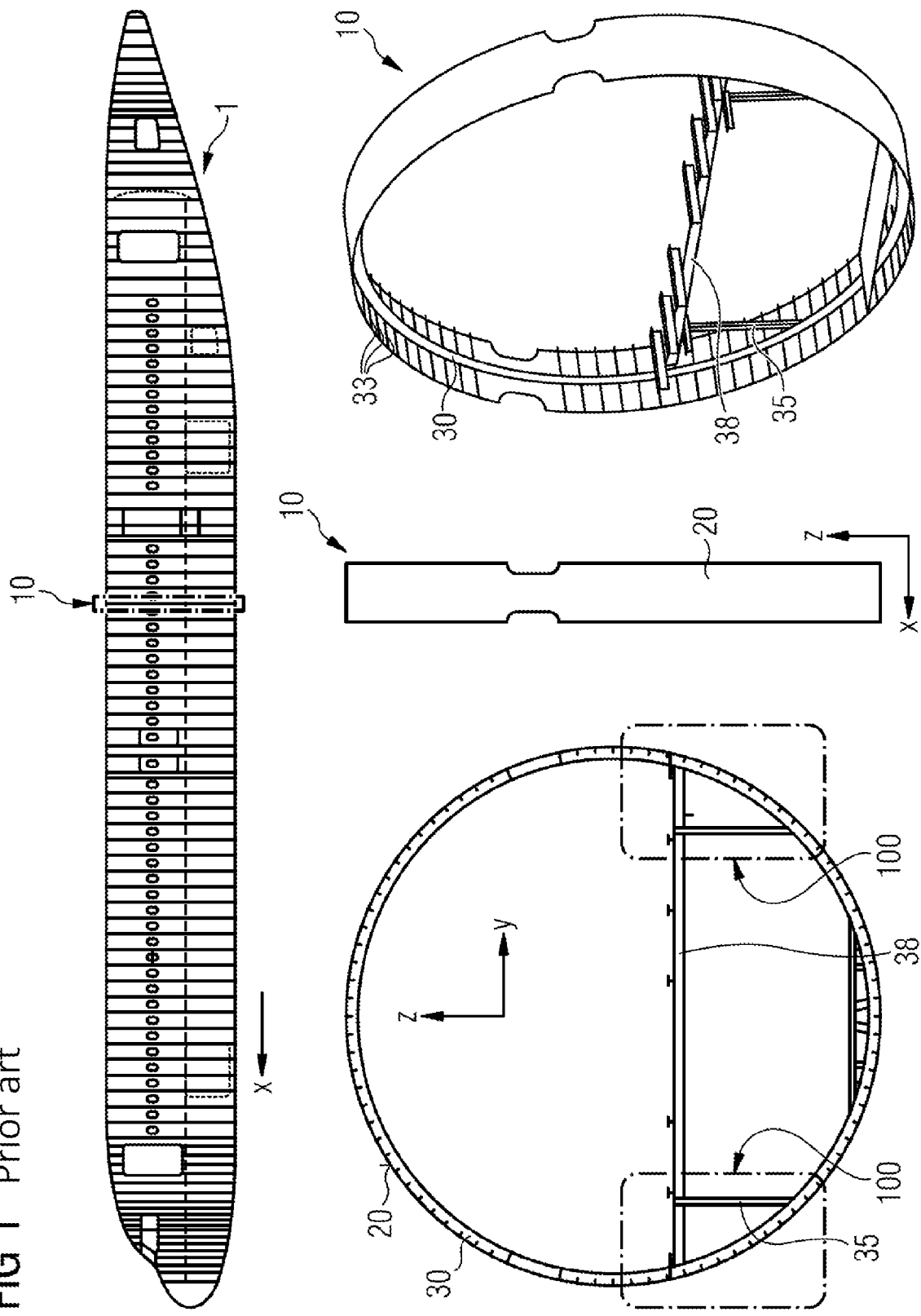
FIG. 1 schematically shows multiple views of an aircraft having an intermediate floor and a triangle region according to the prior art.

FIG. 1 schematically shows an aircraft 1 having an intermediate floor 38 and a triangle region 100 according to the prior art. The aircraft 1 is produced from a multiplicity of frames 10, all of which having the same or a very similar construction design. Such a frame element 10 comprises an encircling former 30, an external skin 20, and stringers 33 which are attached to an internal side of the external skin 20. It goes without saying that the external skin 20 does not have to be provided with the length illustrated but may span a plurality of formers 30. The same applies to the stringers 33.

The intermediate floor 38 separates a cabin area or passenger area lying there above from a baggage area or cargo deck lying there below. The intermediate floor 38 is fastened to a former 30, on the one hand, and is supported on the former 30 by a Z-strut 35, on the other hand. As a result, the former 30, a portion of the intermediate floor 38 and the Z-strut 35 form a triangle region 100. For example, lines can be installed in the longitudinal direction of the aircraft 1 (X-axis) in the triangle region 100.

Usually, the intermediate floor 38, or at least a transverse spar of the intermediate floor 38, is installed and connected to the former 30 on both sides. The Z-struts 35 are subsequently installed and connected at the lower end to the former 30 and at the upper end to the intermediate floor 38. The work required for this purpose is performed on the oblique (round) floor of the cargo deck. Furthermore, the work area in the triangle region 100 is restricted by the already installed intermediate floor 38.

Figure 2:
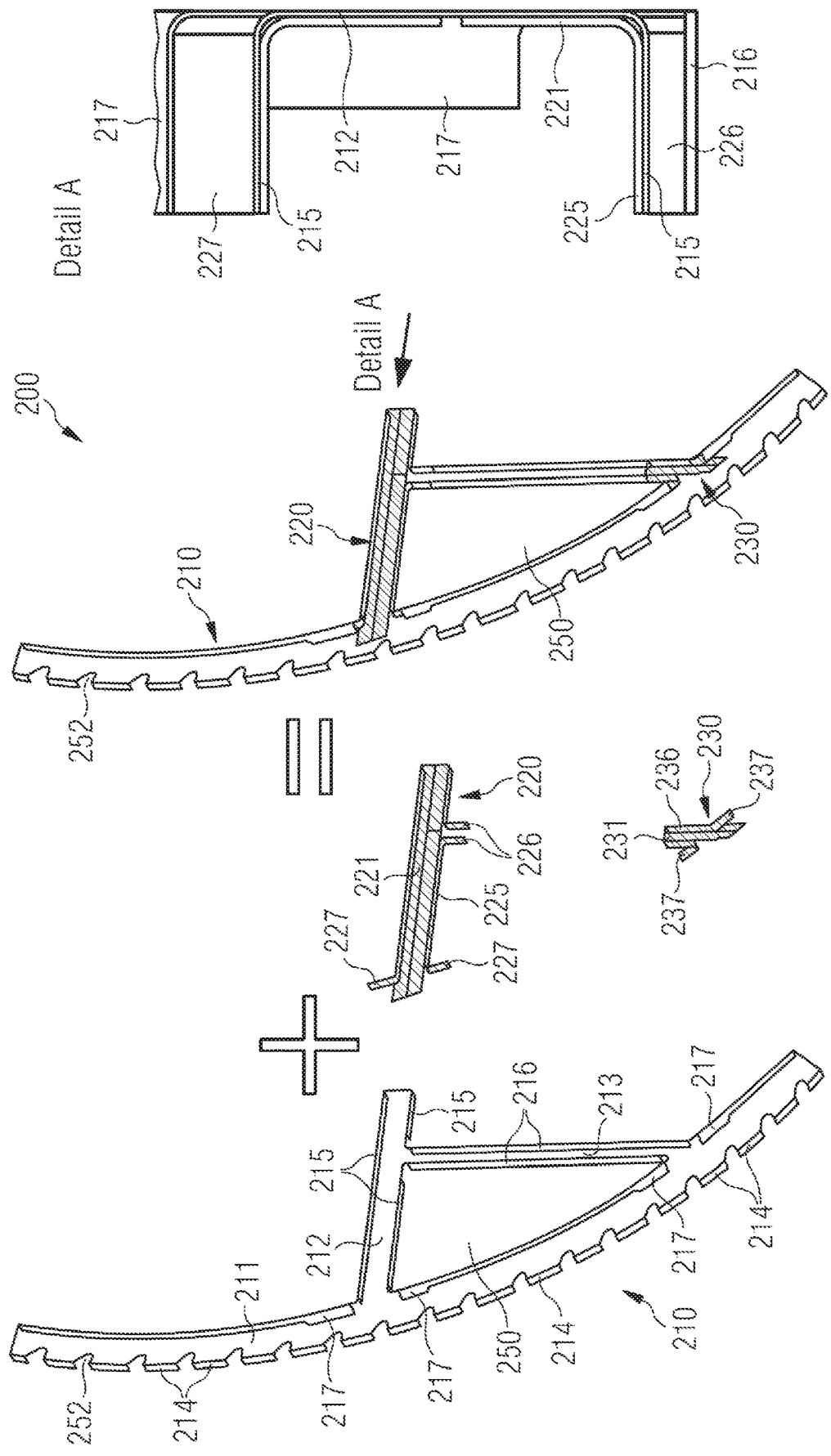
FIG. 2 schematically shows a fuselage structural component having reinforcement elements.

FIG. 2 schematically shows a fuselage structural component 200 according to the present disclosure. Moreover, illustrated are reinforcement elements 220, 230.

The fuselage structural component 200 comprises an integral board 211, 212, 213 which represents a continuous component. The board 211, 212, 213 is produced from a former material, for example, so that the fuselage structural component 200 can be easily integrated into the remaining part of the fuselage of the aircraft 1. The board 211, 212, 213 has an opening 250 which corresponds substantially to the opening of a customary triangle region 100.

The fuselage structural component 200 comprises at least one internal flange 215, 216, 217 which is formed on an internal edge of the board 211, 212, 213 that forms the opening 250. The at least one internal flange 215, 216, 217 is formed on internal edges of the board 211, 212, 213 that face a center of the cross section of the aircraft 1. Since the internal flanges 215, 216, 217 represent a reinforcement of the corresponding portion of the fuselage structural component 200, they are formed in particular in the regions that require reinforcing.

Furthermore, the fuselage structural component 200 comprises at least one external flange 214 which is formed on an external edge of the board 211, 212, 213. The external edge of the board 211, 212, 213 is an edge facing away from a center of the cross section of the aircraft 1. The at least one external flange 214 is formed from the material of the board 211, 212, 213, thus produced so as to be integral to the latter. On the one hand, the external flange 214 forms a reinforcement of the former 210 (or of the former portion 210).

On the other hand, the at least one external flange 214 assumes the function of a customary (conventional) clip (not illustrated) which is attached to a customary (conventional)

former 30, so as to in turn fasten a stringer 33 thereto. In the fuselage structural component 200 according to the present disclosure, a stringer 33 can be attached directly to the external flange 214, the latter being formed to be integral to the remaining part of the fuselage structural component 200. The production of the aircraft, including the attachment of the external skin 20, is significantly accelerated as a result, because no clip needs to be installed. The fuselage structural component 200, on the external edge thereof, has clearances 252 through which the stringers 33 can run.

The integral board 211, 212, 213 forms a former portion 210, a floor beam 212 and a vertical support 213, all of which being adjacent to the opening 250. Since the fuselage structural component 200 is made of one piece, this entire triangle region 100 is produced in a simple manner, and this can take place very quickly, for example by a single pressing procedure (deforming procedure).

Only by way of example, the integral board 211, 212, 213 can be composed of a material with a thickness of 1.0 mm to 4.0 mm, preferably of 1.5 mm to 2.5 mm, and particularly preferably of 1.8 mm. In this way, each flange 214, 215, 216, 217 also has the same material thickness.

The internal flanges 215, 216 in particular reinforce the floor beam 212 and the vertical support 213. For example, the internal flanges 215, 216 can be integrally formed on both sides of the floor beam 212, or both sides of the vertical support 213, respectively, so that a C-shaped or U-shaped integral beam is formed in each case.

In the implementation variant according to FIG. 2, a plurality of internal edges are deformed to a respective internal flange 215, 216, 217, wherein the internal flange 215, 216, 217 is interrupted in a corner between two internal edges. As a result, the individual internal flanges 215, 216, 217 can be produced in a simple manner and in a single deforming step. However, reinforcement elements 220, 230 can be provided in order to reinforce the corners between the respective internal flanges 215, 216, 217, or the corners of the opening 250, respectively. These reinforcement elements 220, 230 can moreover also reinforce the floor beam 212 (in the case of the reinforcement element 220) and the vertical support 213 (in the case of the reinforcement element 230).

In this way, the reinforcement element 220, 230 can bear on a planar portion of the board 212, 213, for example by way of a portion 221, 231 of the reinforcement element 220, 230. Furthermore, the reinforcement element 220, 230 can bear on the internal flange 215, 216, 217, for example by way of a flange portion 225, 236. In other words, the reinforcement element 220, 230 has a cross section which corresponds to that of the floor beam 212, or of the vertical support 213, respectively, but is of a slightly smaller design. In this way, the reinforcement element 220, 230 can be inserted or incorporated into the floor beam 212, or the vertical support 213, and be fastened thereto, respectively.

Only by way of example, a reinforcement element 220, 230 can have a material thickness of 2.0 mm to 4 mm, preferably of 2.5 mm to 3.5 mm, and particularly preferably of 2.8 mm.

Figure 5:
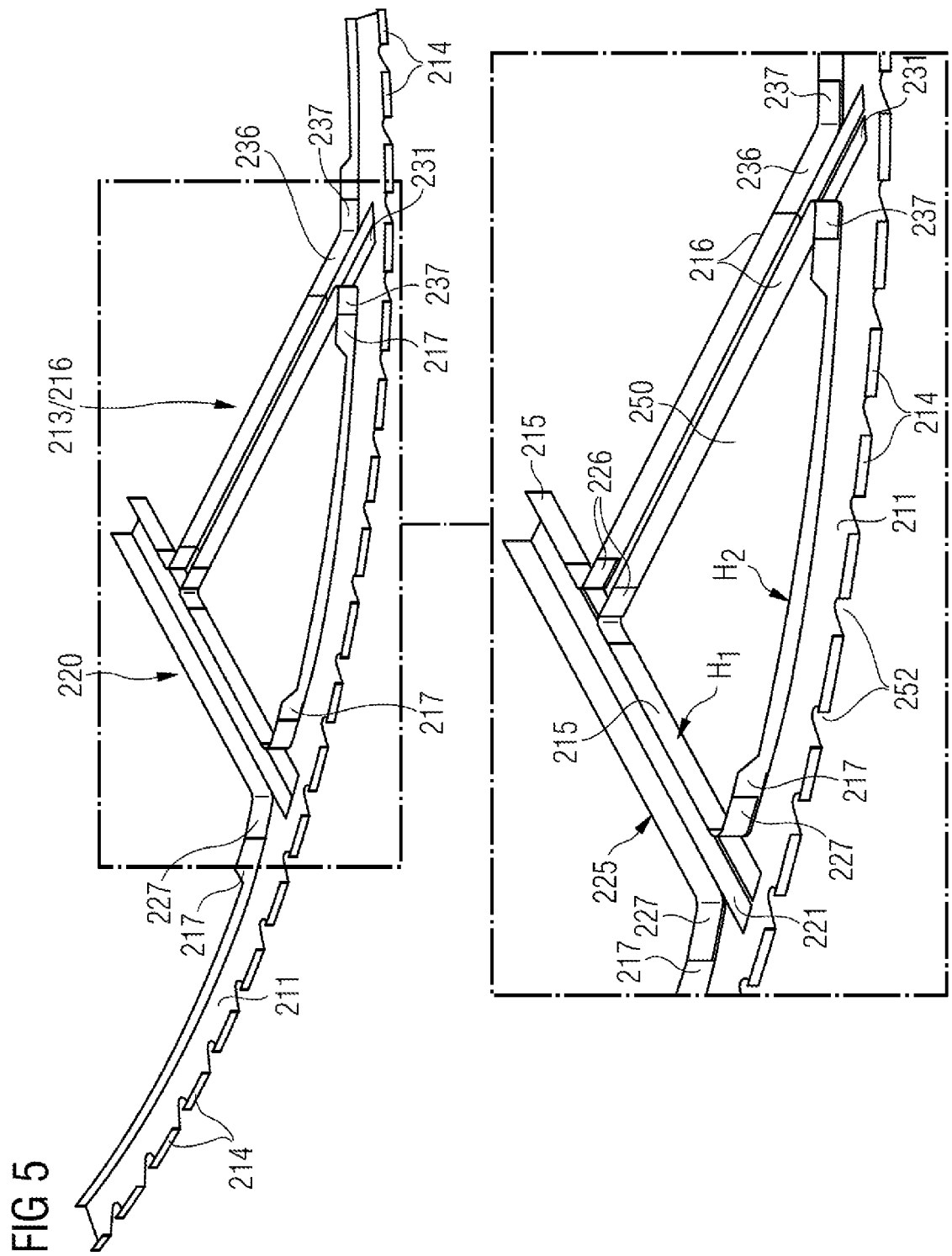
FIG. 5 schematically shows a fuselage structural component having reinforcement elements.

As can be derived in particular from FIG. 5, the reinforcement element 220, 230 can have at least one appendage 226, 227, 237. Such an appendage 226, 227, 237 can extend from a flange portion 225, 236 of the reinforcement element, and likewise extend from one end of the internal flange 215, 216, 217 (beyond this end), and have an arc.

Furthermore, the appendage 226, 227, 237 can also overlap and be fastened to a further internal flange 215, 216, 217 which is integrally formed on a neighboring internal edge. In this way, the appendage can connect two neighboring internal flanges 215, 216, 217 to one another and thus reinforce the latter.

Also illustrated in detail in FIG. 5 is the portion 221, 231 of the reinforcement element 220, 230 that bears on the planar portion of the board 212, 213. These portions 221, 231 can also represent an appendage, so as to form a reinforcement in a transition region between the former portion 210, the floor beam 212 and the vertical support 213.

Figure 3:
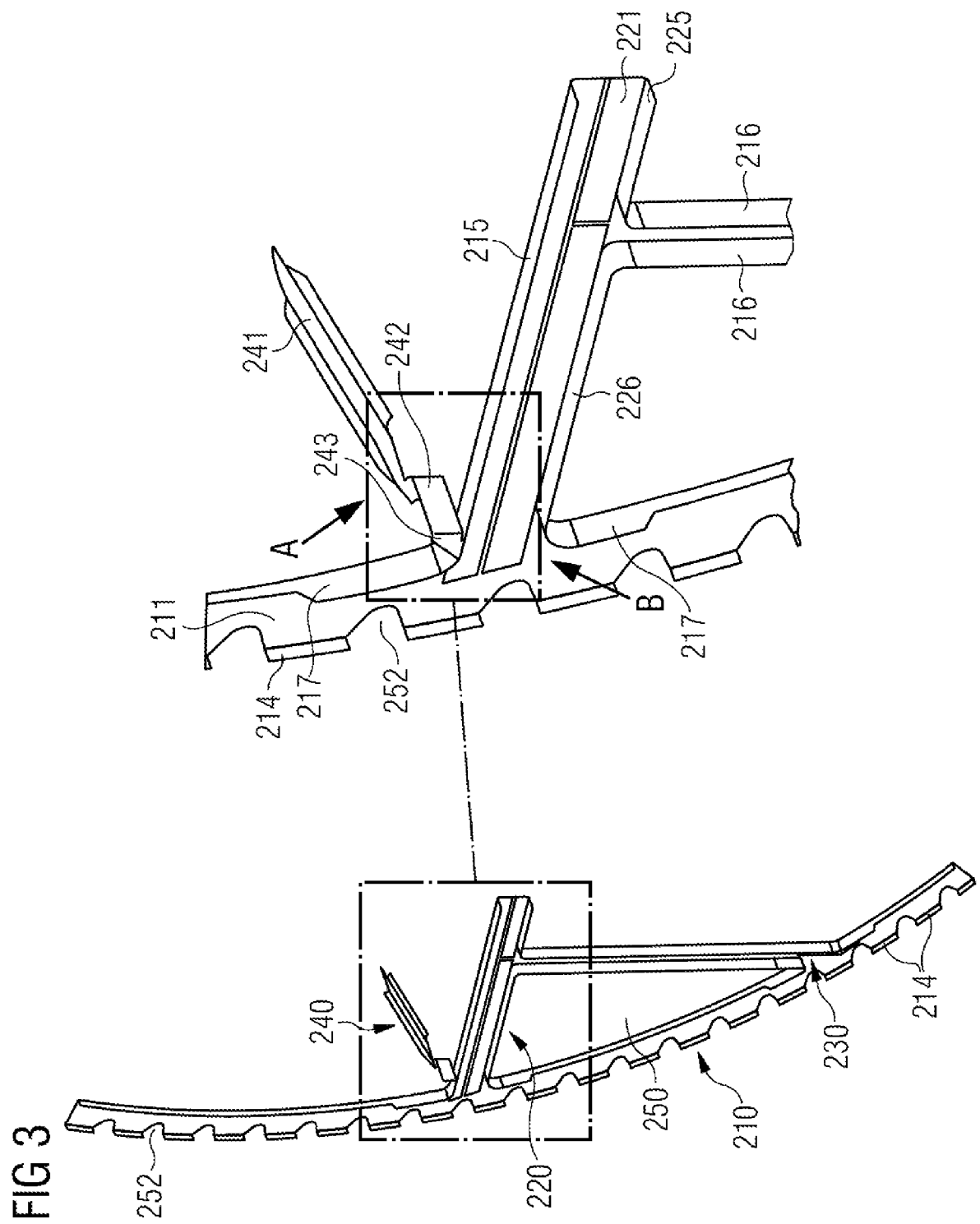
FIG. 3 schematically shows a fuselage structural component having reinforcement elements and a diagonal strut.

FIG. 3 schematically shows a fuselage structural component 200 having reinforcement elements 220, 230, and furthermore having a diagonal strut 240. The diagonal strut 240 serves primarily to connect two formers 30 in the longitudinal direction of the aircraft (X-axis) and herein runs preferably obliquely to the X-axis.

In order to eliminate connecting and fastening of the diagonal strut 240 on the former 30 (at least on one side of the diagonal strut 240), the board 211, 212, 213 can also have a portion which is provided for the diagonal strut 240. In this way, the diagonal strut 240 can likewise be produced to be integral to the remaining part of the board 211, 212, 213. The diagonal strut 240 can be formed in a corresponding deforming step during the production of the fuselage structural component 200.

In the detailed views of FIGS. 3 and 4, the diagonal strut 240 is integrally connected to an internal flange 215 of the floor beam 212 in a first portion 243. This first portion 243 is deformed (bent) relative to the internal flange 215. Further portions 242, 241 can be produced by deformation, so as to form the entire diagonal strut 240. Finally, flanges 244, 245 on the diagonal strut 240 can also be produced by deformation.

Such a diagonal strut 240 can indeed be produced by a plurality of deforming steps, but in turn is integrated into the fuselage structural component 200 (formed integrally with the latter). As a result, all of the connecting elements and associated fastening work are dispensed with at least on one side of the diagonal strut 240.

Figure 6:
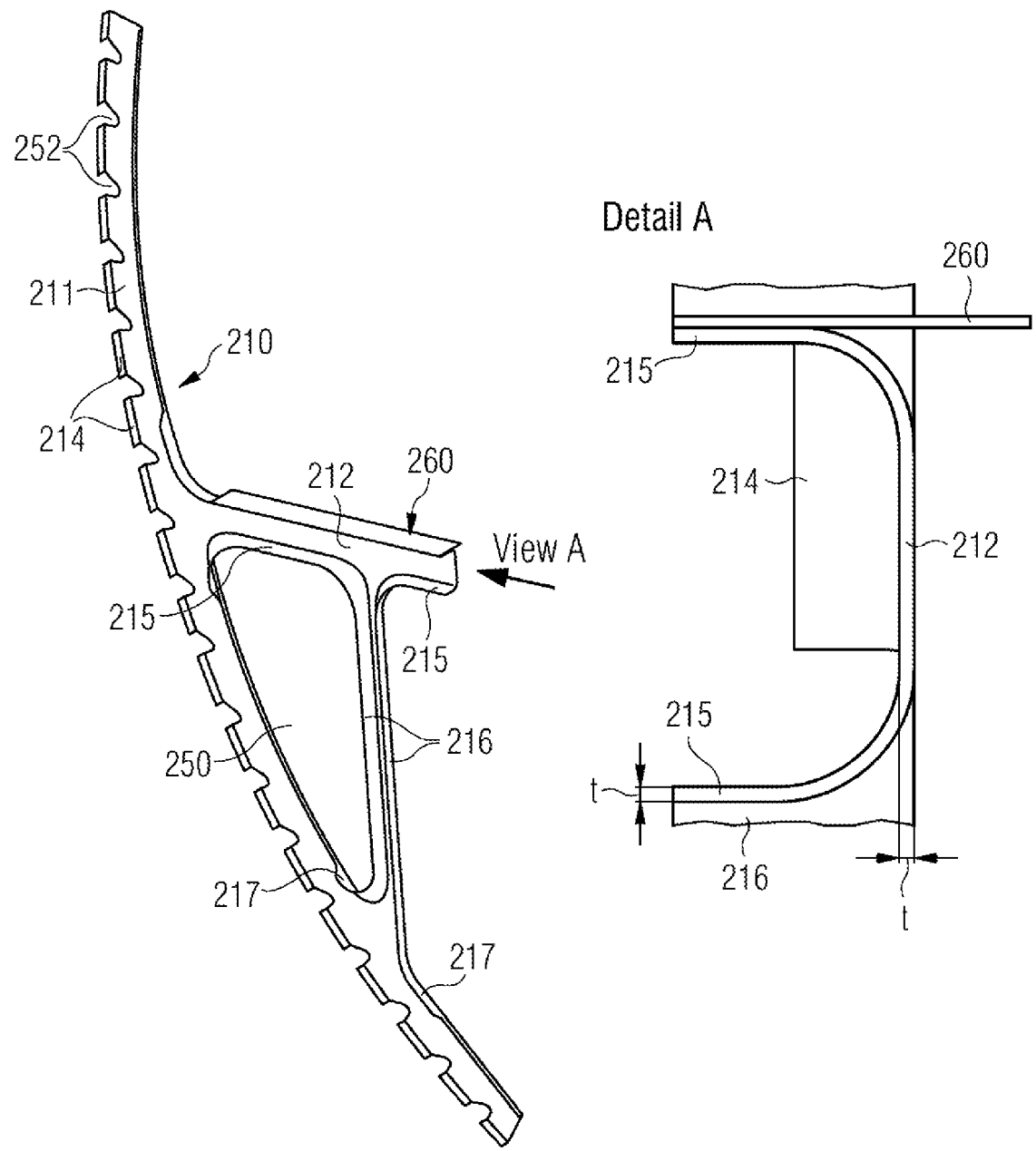
FIG. 6 schematically shows a fuselage structural component having a continuous internal flange.
Figure 7:
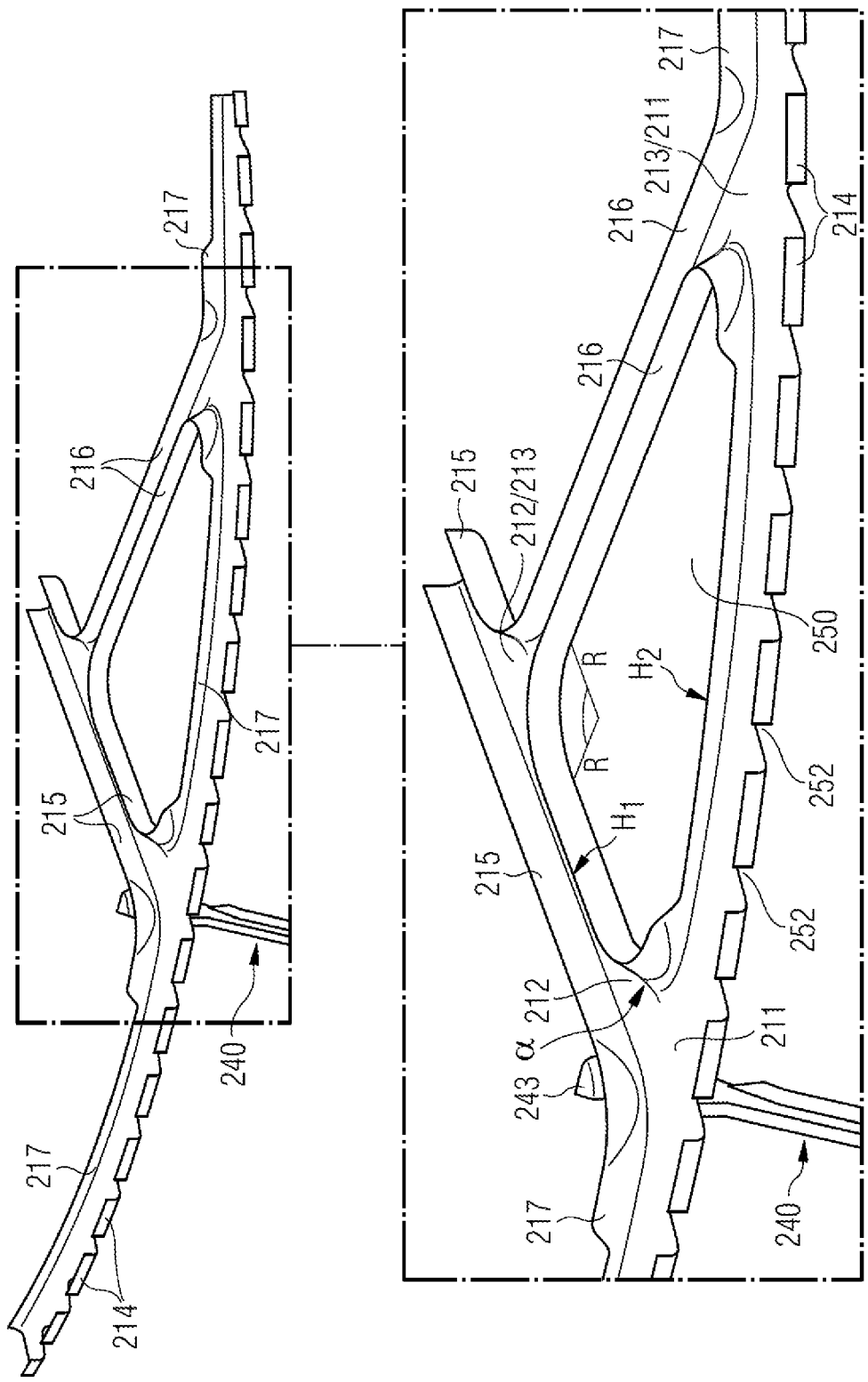
FIG. 7 schematically shows a fuselage structural component having a continuous internal flange and a diagonal strut.

FIG. 6 schematically shows a fuselage structural component 200 having a continuous internal flange 215, 216, 217. Further views and details of this fuselage structural component 200 are illustrated in FIG. 7. For example, a plurality of internal edges can be deformed to a single internal flange 215, 216, 217 which is continuously formed between two internal edges in at least one corner. A separate reinforcement element can be dispensed with as a result, because the fuselage structural component 100 is already configured to be reinforced in the respective corner.

If the continuously formed internal flange 215, 216, 217 is formed by pressing, it is advantageous for the corner to be of a round design. The round design herein is to be understood to mean that the corner has a radius R in the board plane, said radius R rotating about an axis which is perpendicular to the board plane. Otherwise, i.e., if a sharp edge were to be formed (as is the case in FIGS. 2 to 5), deforming the internal edge to an internal flange 215, 216, 217 could lead to the formation of cracks. Only by way of example, the internal flange 215, 216, 217 can have a minimum radius R which depends on a thickness t of the material of the board 211, 212, 213. In the case of a thickness t of the material of 1.0 mm to 2.8 mm, a minimum radius R between 8 cm to 12 cm, preferably of 10 cm, can thus be provided in a corner, and in the case of a thickness t of the material of >2.8 mm to 3.0 mm, a minimum radius R of approx. 12 cm can be provided.

Furthermore, in a corner between two internal edges, the continuously formed internal flange 215, 216, 217 can have an angle α of 110° to 140°, preferably of 120° to 130°, in relation to the board 211, 212, 213. In order to likewise avoid the formation of cracks, the internal flange 215, 216, 217 is not further deformed, for example not up to 90°, as in the variants of FIGS. 2 to 5. However, the internal flange can be further deformed, up to 90° inclusive, outside the corners (thus in the straight regions of the internal flange 215, 216).

Furthermore shown in FIG. 6 is a reinforcement element 260 which can be attached to the floor beam 212. In this way, the load-bearing region on an upper side of the floor beam 212 can be reinforced in particular. The reinforcement element 260 can be fastened to the internal flange 215 (for example by welding, adhesive bonding, screwing or riveting). Only by way of example, the reinforcement element 260 can have a material thickness of 1.0 mm to 4.0 mm, preferably of 1.5 mm to 3.0 mm, and particularly preferably of 2.0 mm.

On the other hand, it is also possible to produce the reinforcement element 260 so as to be integral to the internal flange 215 and thus to be integral to the flat portion 212 of the floor beam 212 and the remaining part of the fuselage structural component 200. In the process, after deforming the internal edge to the internal flange 215, a portion of the board can be deformed to the reinforcement element 260 as illustrated. Alternatively, the reinforcement element 260 can also be integrally formed simultaneously with the internal flange 215. In this case, the reinforcement element 260 has the same material thickness as the internal flange 215 and the flat portion 212 of the floor beam.

Alternatively, it is also possible to provide the reinforcement element 260 on the floor element or intermediate floor to be attached to the floor beam 212 (not illustrated). The reinforcement of the floor beam 212 herein is achieved when assembling the floor element/intermediate floor and the fuselage structural component 200.

Again with reference to FIG. 7, the internal flanges 215, 216, 217 can have different heights. In this way, the internal flange 215 and 216 of the floor beam 212 and of the vertical support 213 in the variant implementation illustrated is configured with a first height H1. In the region of the former portion 210, the internal flange 217 is configured with a second height H2 which may be less than the first height H1. Material and weight can be saved as a result. For example, the reinforcing effect of the internal flange 217 may be less along the former portion 210 than in the region of the floor beam 212 and of the vertical support 213, by way of which greater loads have to be absorbed. These components (floor beam 212, vertical support 213) are more at risk of kinking, which is why the internal flange 215, 216 here should be of a stronger configuration. The internal flange 217 can also be largely dispensed with in the region of the former portion 210. In this way, the internal flange 215, 216 can taper from the floor beam 212, or the vertical support 213, to a height of zero after the corner. As a further example, the internal flange in the corners can be integrally molded with a smaller height than the internal flange in the straight portions of the internal flange 215, 216.

Figure 8:
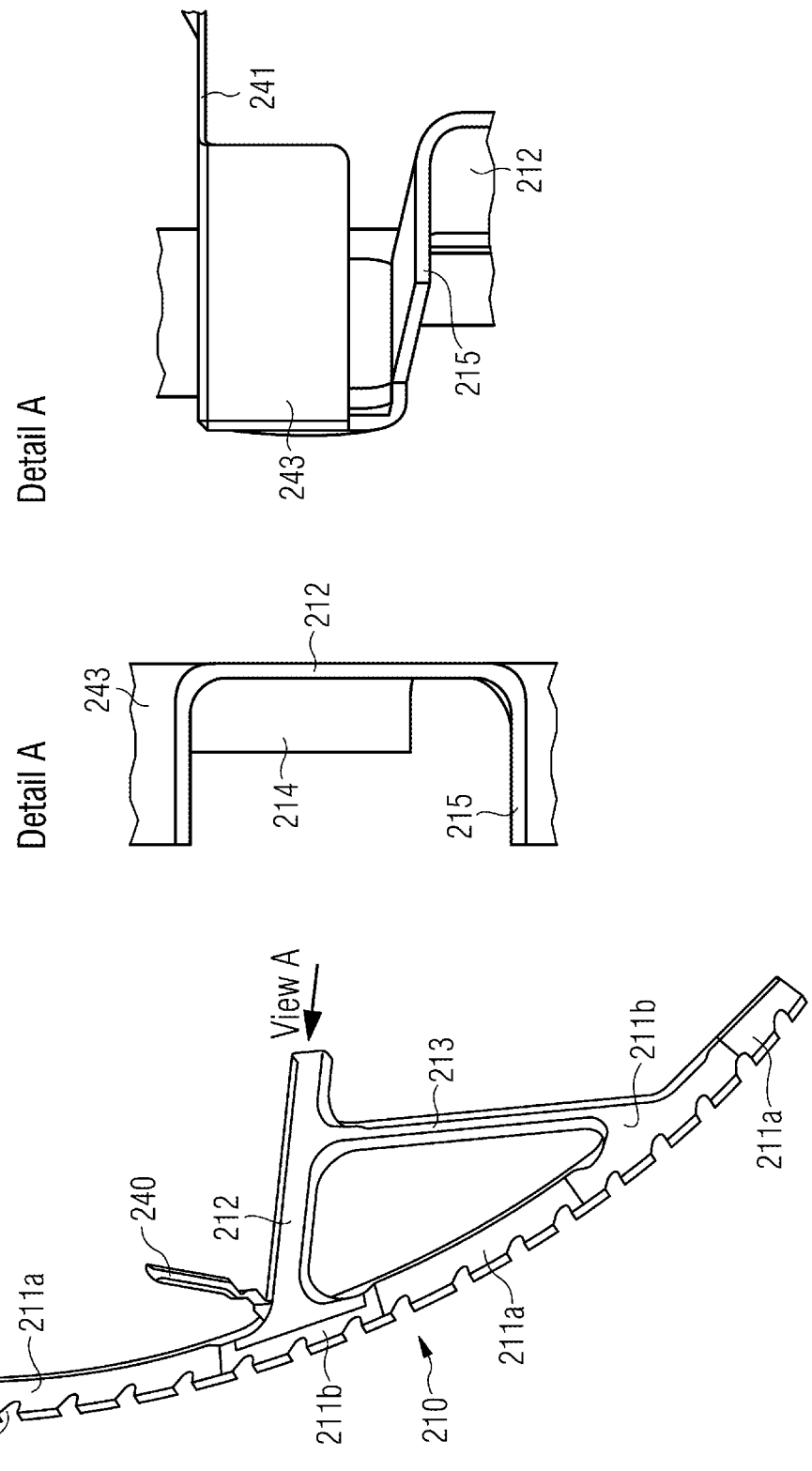
FIG. 8 schematically shows a fuselage structural component having different material thicknesses and a diagonal strut.

Furthermore illustrated in FIGS. 7 and 8 are details of an integrally produced diagonal strut 240. This diagonal strut 240 can be embodied in the same way as in the implementation variant according to FIGS. 3 and 4, which is why the description of the diagonal strut 240 is not repeated here.

FIG. 8 furthermore schematically shows a fuselage structural component 200 having different material thicknesses. In this way, regions 211b of the board into which loads are introduced can be formed with a thicker material than the other regions 211a of the board. These reinforced regions 211b are in particular the transition regions between the former region 210 and the floor beam 212, and between the former region 210 and the vertical support 213. The thicker material 211b can have a thickness of, for example, 1.5 mm to 4.0 mm, preferably of 1.5 mm to 3.0 mm, and particularly preferably of 2.8 mm. In contrast, the thinner regions 211a can be composed of a material with a thickness of 1.0 mm to 3.0 mm, preferably of 1.2 mm to 2.0 mm, and particularly preferably of 1.4 mm or 1.8 mm.

A third material thickness can optionally also be provided in the integral board. In this way, a portion of the board that forms the floor beam 212 and/or the vertical support 213 can be formed from an even thicker material, for example. Only by way of example, the material thickness herein can be between 2.0 mm and 5.0 mm, preferably between 2.5 mm and 4.5 mm, and particularly preferably 4.0 mm.

Figure 9:
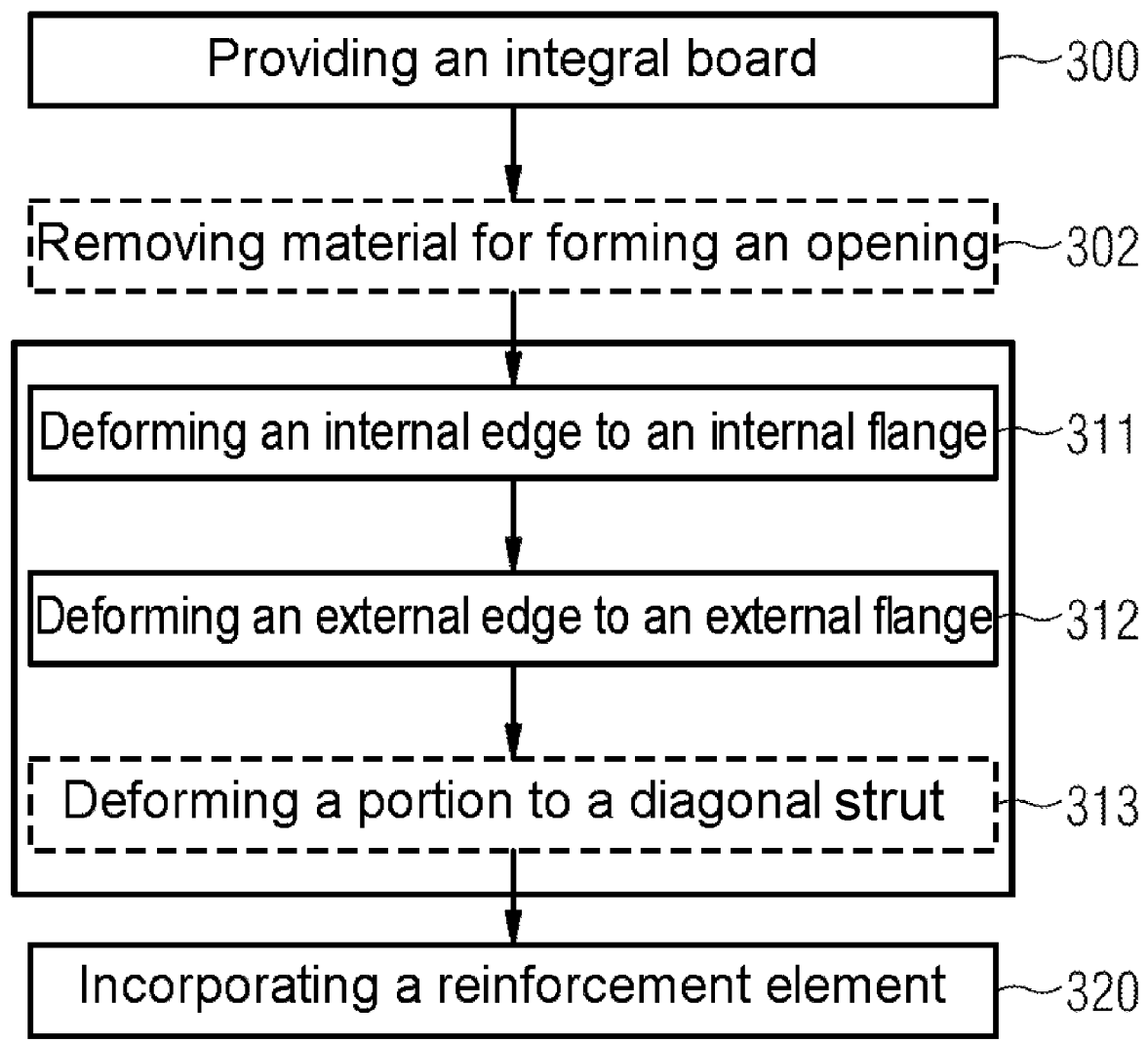
FIG. 9 schematically shows a flow chart of a method for producing a fuselage structural component.

FIG. 9 schematically shows a flow chart of a method for producing a fuselage structural component 200.

The method begins in step 300 with providing an integral board 211, 212, 213 of a former material, wherein the board has an opening 250.

Depending on the material, the opening 250 can be produced in a step 302, by removing the former material from the board in the region of the opening 250. Milling or punching can be used for this purpose, for example.

In a step 311, this board 211, 212, 213 is machined with a view to deforming at least one internal edge of the board that forms the opening 250 to an internal flange 215, 216, 217. In a step 312, at least one external edge of the board 211, 212, 213 is deformed to an external flange 214.

In this way, adjacent to the opening 250, the integral and deformed board 211, 212, 213 forms in each case a former portion 210, a floor beam 212 and a vertical support 213.

In an optional step 313, a portion of the board can be deformed to a diagonal strut 240, so that the diagonal strut 240 is formed to be integral to the board 211, 212, 213.

The deforming steps 311, 312, 313 can be carried out in a single method step. For example, all flanges 214, 215, 216, 217 and at least part of the diagonal strut 240 can be integrally formed in a single pressing step.

A reinforcement element 220, 230, which bears on a planar portion of the board 212, 213 and on an internal flange 215, 216, 217, can likewise optionally be incorporated in step 320.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a fuselage structural component for a triangle region of an aircraft, wherein the method comprises:
    providing an integral board of a former material, wherein the integral board has an opening;

deforming at least one internal edge of the integral board that forms the opening to form an internal flange; and
deforming at least one external edge of the integral board to form an external flange,
wherein, adjacent to the opening, the integral board forms a former portion, a horizontal floor beam, and a vertical support that all intersect to form the triangle region.

2. The method according to claim 1, further comprising: removing the former material from the integral board in a region of the opening prior to deforming the at least one internal edge.

3. The method according to claim 2, wherein the removing comprises milling or punching.

4. The method according to claim 1, further comprising: incorporating a reinforcement element, wherein the reinforcement element bears on a planar portion of the integral board and on the internal flange.

5. The method according to claim 4, wherein the reinforcement element has at least one appendage which extends from one end of the internal flange and has an arc.

6. The method according to claim 1, wherein providing the integral board comprises providing a board with regions of different thicknesses.

7. The method according to claim 6, wherein the integral board is thicker at a transition region in which the former portion intersects the floor beam, or the vertical support, or both.

8. The method according to claim 1, wherein deforming the at least one internal edge comprises:

deforming a plurality of the internal edges to form a plurality of internal flanges, wherein each of the internal flanges is interrupted in a corner between two of the internal edges; or deforming a plurality of internal edges to the internal flange which is formed to be continuous between two of the internal edges in at least one corner.

9. The method according to claim 8, wherein the internal flange has different heights.

10. The method according to claim 8, wherein the internal flange in the corner between two of the internal edges has an angle of 110° to 140° in relation to the integral board.

11. The method according to claim 10, wherein the angle is between 120° to 130°.

12. The method according to claim 1, further comprising:
deforming a portion of the integral board to form a diagonal strut which is integral with the integral board.

13. The method according to claim 1, wherein deforming the at least one internal edge and deforming the at least one external edge are carried out simultaneously.

* * * * *